United States Patent [19]
Cass

[11] 3,747,429
[45] July 24, 1973

[54] YOKE SUPPORT FOR RACK AND PINION GEAR

[75] Inventor: Richard Cass, Birmingham, Mich.

[73] Assignee: TRW Inc., Cleveland, Ohio

[22] Filed: Nov. 9, 1971

[21] Appl. No.: 196,976

[52] U.S. Cl. .................................. 74/492, 74/422
[51] Int. Cl. ............................................. B62d 1/20
[58] Field of Search .................. 74/498, 33, 32, 29, 74/422; 280/96

[56] References Cited
UNITED STATES PATENTS
3,623,379  11/1971  Bradshaw et al. .................... 74/498

Primary Examiner—Milton Kaufman
Attorney—Carlton Hill, Lewis T. Steadman et al.

[57] ABSTRACT

A rack and pinion steering gear assembly having a biasing yoke member positioned on the opposite side of the rack from the pinion, the yoke member being spring-urged against the rack to maintain the teeth thereof in contact with the teeth of the pinion, the rack having a curved surface contacted by the yoke, and the yoke being split to assure contact between the sides of the yoke and the sides of the housing opening receiving the yoke while maintaining contact with the rack.

4 Claims, 4 Drawing Figures

PATENTED JUL 24 1973

3,747,429

YOKE SUPPORT FOR RACK AND PINION GEAR

BACKGROUND OF THE INVENTION

1. Field of the Invention

This invention relates to rack and pinion assemblies and particularly to a yoke support for an automotive rack and pinion steering gear assembly.

2. Prior Art

Rack and pinion assemblies for use in steering systems of vehicles are common to the art. Such assemblies generally include a housing receiving a rack bar longitudinally thereof and a pinion transversely thereof, the pinion having teeth meshing with teeth on one surface of the rack. In order to maintain contact between the rack teeth and the pinion teeth, oftentimes a biasing member or yoke is positioned in the housing opposite the pinion and is biased against the rack to urge the rack into contact with the pinion.

Prior to this, it has been common for the yoke to be received in an opening through the housing communicating to the rack chamber. The opening is generally cylindrical. Because of differences in manufacturing tolerances between the formation of the yoke opening and the formation of the yoke, oftentimes the yoke is considerably smaller than the opening. Because of this, the yoke can pivot in the opening which reduces its effectiveness and its contact with the rack. Such pivoting or tilting can, in extreme cases, bind the yoke in the opening, preventing it from acting against the rack with sufficient force to maintain rack and pinion teeth intermesh.

SUMMARY OF THE INVENTION

This invention overcomes the disadvantages of the prior art yoke systems by providing for an axially split yoke. The yoke, as provided in the preferred embodiment, comprises a cylindrical or curved surface block with a cylindrical recess cut transversely through one end of the block for straddling the rack, the block being axially split and having an axially extending recess in the other end for receipt of a spring.

The spring bottoms against the bottom of the axial recess and urges it against the rack. The axial split of the block into two semi-cylindrical halves allows each half to move away from the other into contact with the side walls of the yoke recess, thereby assuring correct contact with the surface of the rack.

It is therefore an object of this invention to provide an improved rack and pinion assembly.

It is another object of this invention to provide an improved yoke for use in a rack and pinion assembly.

It is a more specific object of this invention to provide a split yoke for use in a rack and pinion steering gear assembly.

It is a more specific object of this invention to provide an axially split yoke providing two yoke pieces having a common axial end dimensioned to engage the outer surface of a curved rack, the yoke portions urged against the rack in a rack and pinion assembly by a biasing means and capable of moving away from one another into contact with the side walls of a housing recess in which the yoke is received, while maintaining contact with the rack surface.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which.

DESCRIPTION OF THE PREFERRED EMBODIMENT

Figure 1:
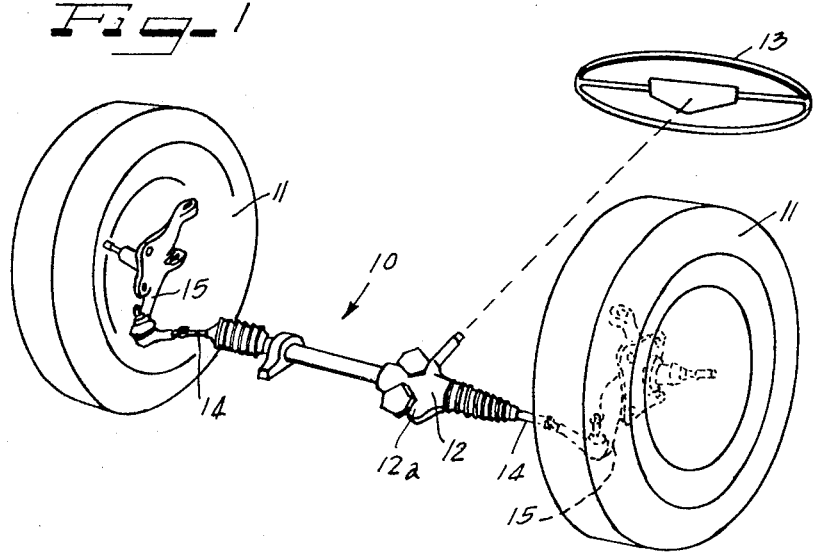
FIG. 1 is a fragmentary perspective view of a steering linkage for use on the dirigible wheels of a vehicle, the linkage including a rack and pinion assembly.

FIG. 1 is a perspective view of a vehicle steering linkage 10 for turning the dirigible wheels 11 of a vehicle. The linkage includes a rack and pinion steering gear contained in a housing 12 operated by a connection with the steering wheel 13. A rack moves transversely of the vehicle and terminates in tie rods 14 connected to the steering bars 15 of the wheel attachments.

Figure 2:
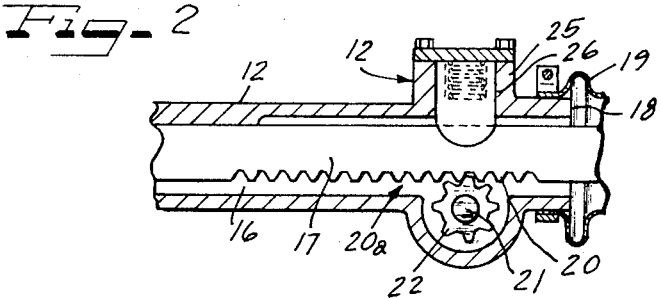
FIG. 2 is a fragmentary longitudinal section of a rack and pinion steering gear.
Figure 3:
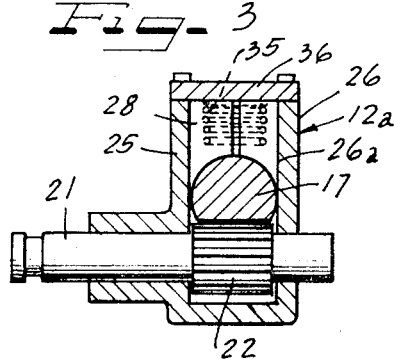
FIG. 3 is a cross-sectional view of FIG. 2, taken along the lines III—III of FIG. 2.

As best illustrated in FIGS. 2 and 3, the rack and pinion steering gear housing 12 has an opening 16 therethrough which receives the rack bar 17. The rack bar projects from the ends of the housing 12, one of which is indicated at 18, and projects through a bottom seal 19 providing sealing of the openings in the ends of the housing 12.

While the rack bar 17 is basically cylindrical, it has a toothed portion 20, the teeth being cut into the surface of the rack bar to a depth less than the radius of the bar.

The housing 12 has an increased size portion or boss 12a which receives the pinion 21 transversely therethrough. The pinion has a toothed area 22 positioned under the rack or toothed portion 20a of the rack bar 17. The teeth 22 of the pinion intermesh with the teeth 20 of the rack 20a and as the pinion is rotated, the rack bar is moved in a plane normal to the axis of the pinion.

The portion 12a of the housing includes a housing bulge or boss 25 opposite the pinion. This boss 25 has an opening 26 thereinto, which communicates with the opening 16 and which projects in a plane perpendicular to the plane of the opening 16. The opening 26 receives a yoke or saddle member 28 which is urged into contact with the surface of the rack bar 17. The yoke has an outer surface 30 extending in a plane normal to the plane of the rack bar when the yoke member is seated on the rack bar, the plane intersecting the longitudinal axis of the rack bar.

Normally, the surface 30 is circular and the yoke is cylindrical, having one axial end thereof 31 terminating in a part cylindrical recess 29 co-dimensioned with respect to the surface of the rack bar so as to be engageable thereby. A spring member 35 is entrapped between a portion of the yoke and a closure plate 36 used to close the opening 26. The spring member 35 urges the yoke against the surface of the rack bar 17 opposite the pinion 21 so as to urge the rack 20 into contact with the teeth 22 of the pinion to insure a positive two-dimensional positioning of the rack to the pinion, thereby maintaining proper tooth engagement between the pinion teeth and the rack teeth.

Since the opening 26 is preferably cylindrical or arcuately curved and since the yoke 28 is normally cylindrical or of like curvature to the opening, the yoke is easily fitted into the opening.

However, because of the difficulty of maintaining exact tolerances in the formation of the housing and of the opening 26 and of maintaining identical tolerances in the manufacture of the yoke 28, the dimensions oftentimes vary with the yoke being considerably smaller than the opening 26. In that case, such a yoke will generally find its center on the rack and "float" in the cylindrical housing because of the differences in tolerances. This floating can sometimes allow the yoke to tilt in the opening, thereby decreasing its effectiveness in maintaining the rack against the pinion. If the rack moves away from the pinion, failure of the teeth to intermesh can occur. Such a situation eliminates steering wheel control over the attitude of the dirigible wheels 11.

Figure 4:
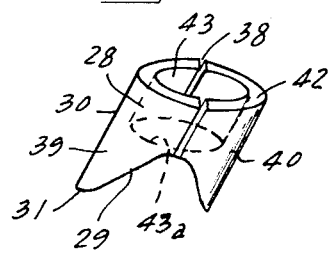
FIG. 4 is a perspective view of the yoke of this invention.

In order to eliminate this, the yoke of my invention, preferably shown in FIG. 4, is axially split as at 38 into two half-cylindrical members 39 and 40. The split 38 is axial extending from the part cylindrical surface 29 to the axial end 42. A central bore 43 can be provided in the end 42 blind into the material of the yoke terminating in a bottom wall 43a. The opening 43 can then receive the spring 35 while the peripheral portion of the end 42 can abut the closure plate 36 providing a maximum dimension for positioning of the rack within the housing.

The splitting of the yoke allows the yoke to seek a positive contact position between the surface 30 and the side wall 26a of the opening 26 while maintaining contact with the surface of the rack. The spring exerts a constant force to maintain a positive contact on both the surface of the rack and of the opening 26. Further, because of the positive urging of the spring, the split halves of the yoke will tend to move away from one another to maintain contact with the surface 26a of the opening 26 while at the same time maintaining a proper attitude of contact with the yoke due to the curvature of the surface 29 of the yoke. To the extent that dimensional differences between the opening and the split yoke are great enough to have an effect upon the contact between the surface 29 and the surface of the rack bar, formation of the yoke out of a wearable material such as a plastic, preferably a self-lubricating plastic, will assure the formation of a large wear patch area quickly providing a good wear surface and interfit between the yoke and rack.

Thus, it can be seen from the above that my invention provides a yoke which is assured of seating in engagement with the wall of the yoke recess and in contact with the surface of the rack bar while maintaining a proper attitude in the recess and against the rack bar.

Although the teachings of my invention have herein been discussed with reference to specific theories and embodiments and although illustrative means for accomplishing explained results have been described, it is to be understood that these are by way of illustration only and that others may wish to utilize my invention in different designs or applications.

I claim:

1. In a rack and pinion steering gear assembly having a rack bar received longitudinally of a housing and a pinion received transversely thereof with a yoke received in a recess of the housing opposite the pinion on the other side of the rack and effective to urge the rack into engagement with the pinion, the improvement of the yoke being split into two parts, the split lying in a plane normal to the axial plane of the rack.

2. A yoke for use in rack and pinion steering gear assemblies comprising a cylindrical member having axial ends, one of said axial ends having a part cylindrical recess formed therein transverse of the yoke axis, the said yoke being split along its axis into two parts.

3. The yoke of claim 2 wherein the end opposite the end having the part cylindrical recess has a recess extending axially thereinto and terminating blind within the yoke, a portion of the axially extending recess being formed in each half of the split yoke.

4. A rack and pinion steering gear assembly comprising a housing, said housing having a longitudinal dimension, an opening extending longitudinally through said housing, a rack bar positioned in said opening, a pinion projecting into said housing transversely of said housing, said pinion having circumferentially spaced teeth therearound, said rack bar having teeth extending thereinto from the surface thereof, said rack teeth intermeshable with the pinion teeth, said rack bar having a surface opposite the said teeth, said housing having a recess thereinto communicating with the opening, said recess positioned opposite the pinion, said recess having a wall surface lying in a plane normal to the plane of the axis of the rack, a yoke received in said recess, said yoke comprising two mirror image parts each of which has an outer surface dimensioned to mate with the wall surface of the recess and a surface opposed to a surface of the other portion, each of said portions having an end surface configured to mate with the surface of the rack bar and means urging the said portions against the said surface of the rack bar and against the wall of the recess.

* * * * *